Oct. 25, 1932.                 W. W. LASKER                 1,883,985
                INDICATING MEANS FOR CARD PUNCHING MACHINES
                  Filed June 17, 1927        2 Sheets-Sheet 1

Inventor
William W. Lasker
By his Attorney
W. A. Sparks

Oct. 25, 1932.　　　W. W. LASKER　　　1,883,985
INDICATING MEANS FOR CARD PUNCHING MACHINES
Filed June 17, 1927　　　2 Sheets-Sheet 2

Inventor
William W. Lasker
By his Attorney
H. A. Sparks

Patented Oct. 25, 1932

1,883,985

UNITED STATES PATENT OFFICE

WILLIAM W. LASKER, OF BROOKLYN, NEW YORK, ASSIGNOR, BY MESNE ASSIGNMENTS, TO REMINGTON RAND INC., OF NEW YORK, N. Y., A CORPORATION OF DELAWARE

INDICATING MEANS FOR CARD PUNCHING MACHINES

Application filed June 17, 1927. Serial No. 199,566.

This invention relates to indicating means for use in connection with card punching or perforating machines, such as that which is well-known on the market as the Powers punch.

The principal object of the invention, generally stated is to provide indicating means associated with different parts of the machine and so correlated with each other and with the machine parts as to materially assist in the operation of the machine.

Another object is to provide means of this nature which includes an indicating strip arranged so as to also provide means for holding a portion of a punch card for indicating to the operator the position and condition of the parts of the machine with reference to a card to be punched.

Another object of the invention is to provide an indicating scale with staggered numerals or indicia and with a traverse member adapted to display a desired number and to obscure numbers adjacent to that displayed.

Another object of the invention is to provide traverse means for a scale so constructed as to instantaneously associate numbers on the scale with associated position on a punch card.

Another object of the invention is to readily indicate the position at which the carriage will be stopped on its return movement.

Another object of the invention is to provide indicating means for instantly indicating to the operator the position of punch release latches which he may wish to render inoperative, as is desirable in arranging for gang punching.

Another object of the invention is to provide a single form of scale which may be utilized at different places on the punch to indicate the position of the carriage, the position to which the carriage may be returned, and the latches which have been thrown out for gang punching.

Other objects will be apparent from the following description and appended claims and from an inspection of the accompanying drawings, in which:

Like characters of reference refer to like parts in all views.

Figure 1:
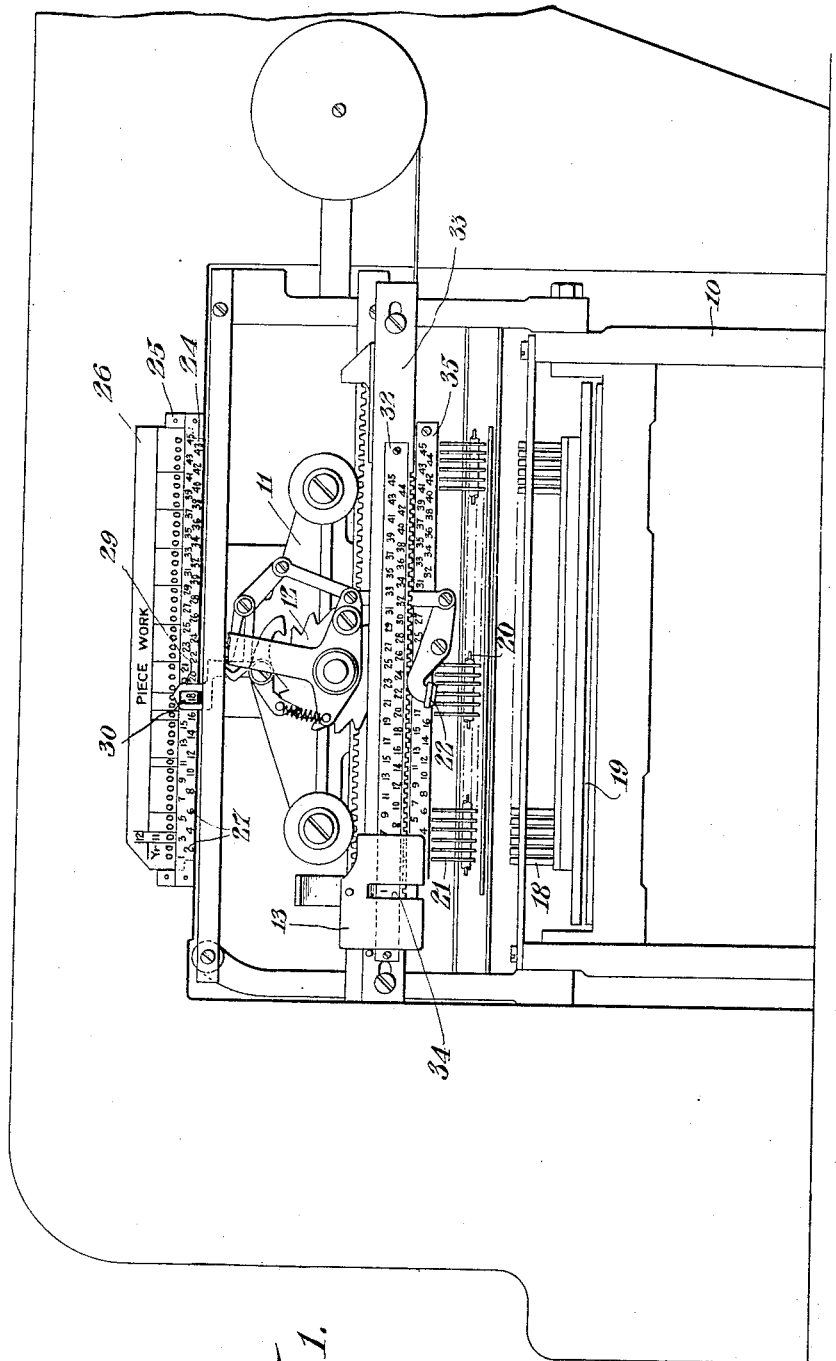
Fig. 1 is a front elevation of a Powers card punching machine provided with my improved indicating means.

Referring particularly to the drawings, 10 represents the framework of the machine upon which is mounted in any suitable manner a carriage 11 movable crosswise of the machine as shown in Fig. 1. An escapement wheel is shown at 12 which cooperates with escapement pawls for controlling movement of the carriage step-by-step from left to right in Fig. 1. Mechanism is provided in the machine for drawing the carriage toward the right and for returning the carriage to home position toward the left, such mechanism not being shown in all of its details in the accompanying drawings as it is not claimed per se herein. This mechanism is shown in U. S. Letters Patent to Lasker 1,684,546, Sept. 18, 1928. The home position of the carriage is determined by a block indicated at 13 which is slidable transversely of the machine and may be set at different positions so as to fix the limit of the carriage return movement at different positions.

Figure 2:
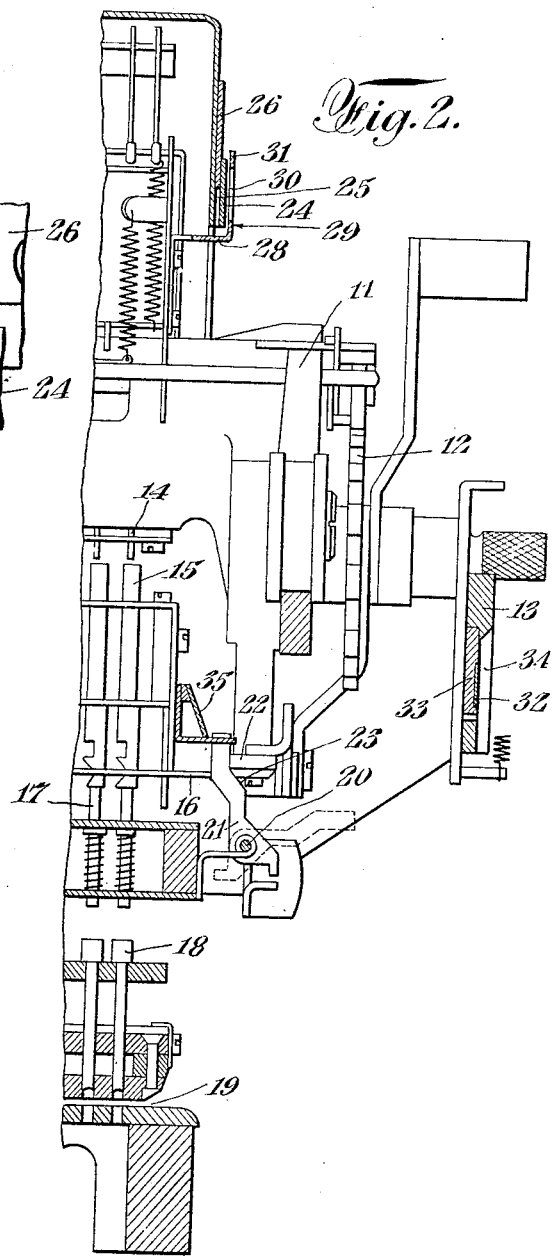
Fig. 2 is a fragmentary vertical front to rear sectional view of the same.

As shown in Fig. 2, the carriage carries with it setting members 14 which are operable to depress set-bars 15. The carriage moves this row of setting members 14 from row to row of the set-bars 15 so that a set-bar 15 may be depressed in each row if desired. When the set-bars 15 are depressed, they are held in depressed position by spring pressed latch bars 16 there being one latch bar 16 for each row of set-bars 15. Mounted under each set-bar 15 is a set-bar spring-pin 17 which is depressed upon depression of its respective set-bar 15 and is held depressed as long as the set-bar 15 remains in set position. Punches are indicated at 18 and cooperate with such pins 17 as may be set, to punch or perforate a card held in the card throat 19. Pivoted on a rod 20 are a plurality of releasing pawls or members 21 there being one releasing pawl or member for each latch-bar 16. Each releasing member is movable from its full line operative position to the dotted line inoperative position shown in Fig. 2 for purposes which will hereinafter appear. Each releasing member 21 is arranged, when in the operative position, with its upper end in contact with its respective release bar 16. A bevel roller 22 carried by the carriage is adapted to be depressed and moved across the oblique faces 23 of such of the release pawls 21 as happen to be in upon the return of the carriage to normal, thereby operating all of the operative release pawls 21 which it passes on such return movement. The effect of thus operating the operative releasing members 21 is to effect the movement of their respective latch-bars 16, whereby any set-bars 15 latched thereby will be released and will return to normal position under action of the springs of the respective pins 17.

The term gang punching has been used in the art to indicate the operation of a card punch when certain mechanisms are selectively set and remain set so that the respective punches will effect the same punching at each operation of the machine while other of the punch controlling mechanisms may be returned to normal position at each operation of the machine, for instance in punching the same date on a number of cards which may have other data punched on them that may be individual to each. In order to accomplish this, each of the releasing members 21 may be moved pivotally about the shaft 20, to the inoperative position indicated in dotted lines in Fig. 2, as hereinbefore indicated, so that upon the return of the carriage the roller 22 cannot effect the release of the respective latch bars 16 controlled by such inoperative releasing members 21, thereby holding any set-bar 15 in that row latched if it has been previously moved to effective position.

All of the above described mechanism is well-known equipment of the Powers card punching machine. It will now be seen that it is desirable to have a clear indication at any time of the point at which the carriage, and the row of setting devices 14 carried thereby, has arrived in its step-by-step movement so as to determine the row of set-bars 15 with which the devices 14 will be in cooperative relation; that it is desirable to have a clear indication of the point at which the carriage will be stopped in its return movement; and to have an indication of which of the releasing members 21 have been rendered inoperative and consequently which of the associated punches remain effective for gang punching work. Furthermore, it is desirable to have the indication of the carriage position in juxtaposition to a card or similar indicia, indicating the form of card being punched by the machine so as to correlate the position of the carriage and the elements specified above with the positions at which data is to be indicated or punched on the card. It will also be seen that it is desirable to have all of these indicating means cooperate with each other and with the mechanism of the machine for producing punch cards rapidly and correctly.

Figure 3:
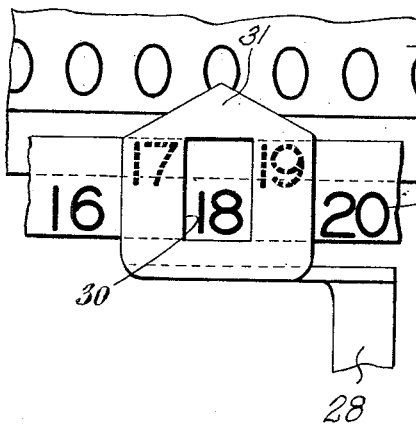
Fig. 3 is a fragmentary enlarged detail front view of the indicating strip and its traversing means in the position shown in Figure 1.
Figure 4:
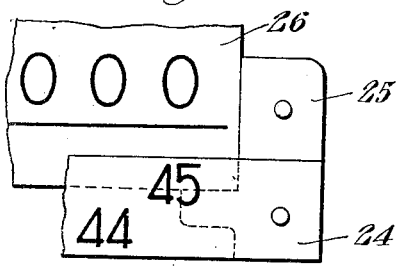
Fig. 4 is an enlarged fragmentary detail front view illustrating the formation and mounting of the indicating scale so as to form a card holder.

To this end, I have detachably secured an indicating strip 24 to the framework of the machine, spacing the same slightly from the framework by spacers 25 of L shaped form, the horizontal legs of said spacers being extended inwardly as clearly shown in Figs. 1 and 4, whereby a pocket is formed to receive a portion of a punch card indicated at 26. The strip 24 carries indicia 27 in the form of numbers, such numbers being arranged in upper and lower rows and in staggered relation to each other, so that the beginning of one number may be on substantially the same vertical line as the adjacent preceding number, whereby the numbers are distinct and easily readable and may be of a larger size than if all were crowded into a single row. Mounted in any suitable manner on the carriage 11 and extending upwardly therefrom is a pointer or traversing member 28 having an enlarged portion 29 adapted to travel along the indicator strip 24. This enlarged portion 29 is provided with an aperture 30 through which only one of the numbers 27 may be read at a time. The portions of the enlargement 29 adjacent the aperture 30 are broad enough to entirely cover and block out the two numbers adjacent the number displayed, as clearly indicated in Fig. 3. The end of the traversing member 28 is formed into a pointer 31, which traverses the card 26 so as to clearly indicate the position of the carriage with regard to the card to be punched.

A second indicator strip exactly like the strip 24 is indicated at 32 and is carried by the frame of the machine, being connected in any suitable manner to the bar 33 upon which the block 13 is mounted. The block 13 is slotted at 34 so as to provide an aperture through which the indications on the strip 32 may be read. The slot 34 is just wide enough to permit the exposure of a single number on strip 32 and the solid portions of the block cover the adjacent numbers. A similar indicating strip 35 is secured to the framework of the machine just in rear of the upper ends of the releasing latches 21 and by cooperation of the numerals on the strip 24, 32, and 35 the operator can readily determine which ones of the releasing latches 21 he should move to ineffective position in the attainment of gang punching if he so desires.

While the form of the invention which I have described is admirably suited to effect the objects primarily stated it is obvious that various changes may be made, without departing from my invention, as it is defined in the accompanying claims.

What is claimed is:

1. In a card punching machine, the combination with a movable carriage thereof, of an indicia bearing strip mounted in operative relation thereto, a pair of L-shaped spacing members co-operative with said strip for forming a card pocket, an indicia bearing card in said pocket, and a traversing member mounted on said carriage and formed with elements for visually correlating indicia on said strip with indicia on said card to indicate the position of said carriage.

2. In a machine for punching cards, the combination of a carriage, a carriage scale, a device for holding in juxtaposition to said scale a sample card or portion thereof, and an index cooperating both with the carriage scale and also with the columns of said card.

3. In a machine for punching cards, the combination of a traveling carriage, a carriage scale on which the carriage positions are numbered, means for mounting a sample card in juxtaposition to said scale, and an index cut out so as to expose through an opening the number of the position at which the carriage stands at any given time, said index also including a pointer to indicate the corresponding position on the sample card.

In testimony whereof I affix my signature.

WILLIAM W. LASKER.